United States Patent [19]

Thrasher, Jr.

[11] 4,125,176
[45] Nov. 14, 1978

[54] INJECTION TYPE LUBRICATING APPARATUS

[75] Inventor: George E. Thrasher, Jr., Pontiac, Mich.

[73] Assignee: Master Pneumatic-Detroit, Inc., Sterling Heights, Mich.

[21] Appl. No.: 817,802

[22] Filed: Jul. 21, 1977

[51] Int. Cl.² .............................................. F16N 13/16
[52] U.S. Cl. ................................ 184/56 A; 184/1 C; 184/29; 417/402; 417/238
[58] Field of Search ...................... 184/56 A, 56 R, 29, 184/1 C, 72, 76, 7 D; 92/138; 417/238, 388, 402

[56] References Cited

U.S. PATENT DOCUMENTS

| 1,587,507 | 6/1926 | Church | 184/76 UX |
| 1,915,443 | 6/1933 | Pelouch | 184/29 UX |
| 2,506,235 | 5/1950 | Nicolls | 417/388 X |
| 3,693,757 | 9/1972 | Callahan et al. | 184/29 X |
| 3,926,279 | 12/1975 | Thrasher | 184/1 C X |
| 3,955,647 | 5/1976 | Tine et al. | 184/56 R |

FOREIGN PATENT DOCUMENTS 1,138,952  10/1962  Fed. Rep. of Germany ............ 184/29

Primary Examiner—David H. Brown
Attorney, Agent, or Firm—Barnes, Kisselle, Raisch & Choate

[57] ABSTRACT

Pump body has a cylindrical chamber within which a spool-shaped insert fits. The insert has a central cylindrical bore within which the injection plunger works and has an external annular groove communicating with the bore through a lubricant supply port having a diameter smaller than that of the bore. Lubricant is furnished to the bore through an opening in the pump body which communicates into the annular space defined by the insert groove. The fit between the plunger and bore is interrupted only through the arcuate extent of the diameter of the lubricant supply port.

8 Claims, 2 Drawing Figures

INJECTION TYPE LUBRICATING APPARATUS

This invention relates generally to lubricators of the type which utilize a plunger reciprocable in a guideway to force a predetermined quantity of lubricant intermittently through an outlet to equipment to be lubricated. More particularly, the invention involves lubricators of this type which in each cycle of operation deliver very small quantities of lubricant, typically from about 1/20 of a drop to about ½ drop, a drop being defined as 1/30 cc. Such lubricators, for example, are frequently used to lubricate pneumatically powered motors.

Conventional lubricators of this type have several disadvantages arising in part from the small quantities of lubricant which they are required to deliver. First, the pump body is relatively expensive since it must be made of a metal which can be machined to close tolerances to provide a close fit between the plunger and guideway. Second, a pump having a given diameter guideway and plunger has a limited range of delivery rates determined by the axial stroke of the plunger and outside of that range a pump body having a different diameter guideway machined therein must be provided.

Third, the line or passageway through which lubricant is supplied to the plunger must have a diameter which is large as compared to that of the plunger to insure venting of air bubbles in the lubricant supply which would otherwise interfere with operation of the pump. As a result, when the plunger penetrates beyond the supply passageway into the guideway during the injection stroke of the plunger, lubricant can escape in a retrograde direction past the entire periphery of the plunger making it difficult to deliver accurately the desired quantity of lubricant, especially at low delivery rates.

The object of this invention is to provide a relatively simple, inexpensive pump structure of the type under consideration which is improved to eliminate partially or entirely the disadvantages set forth above. One form of the invention is shown in the accompanying drawings in which.

Figures 1, 2:
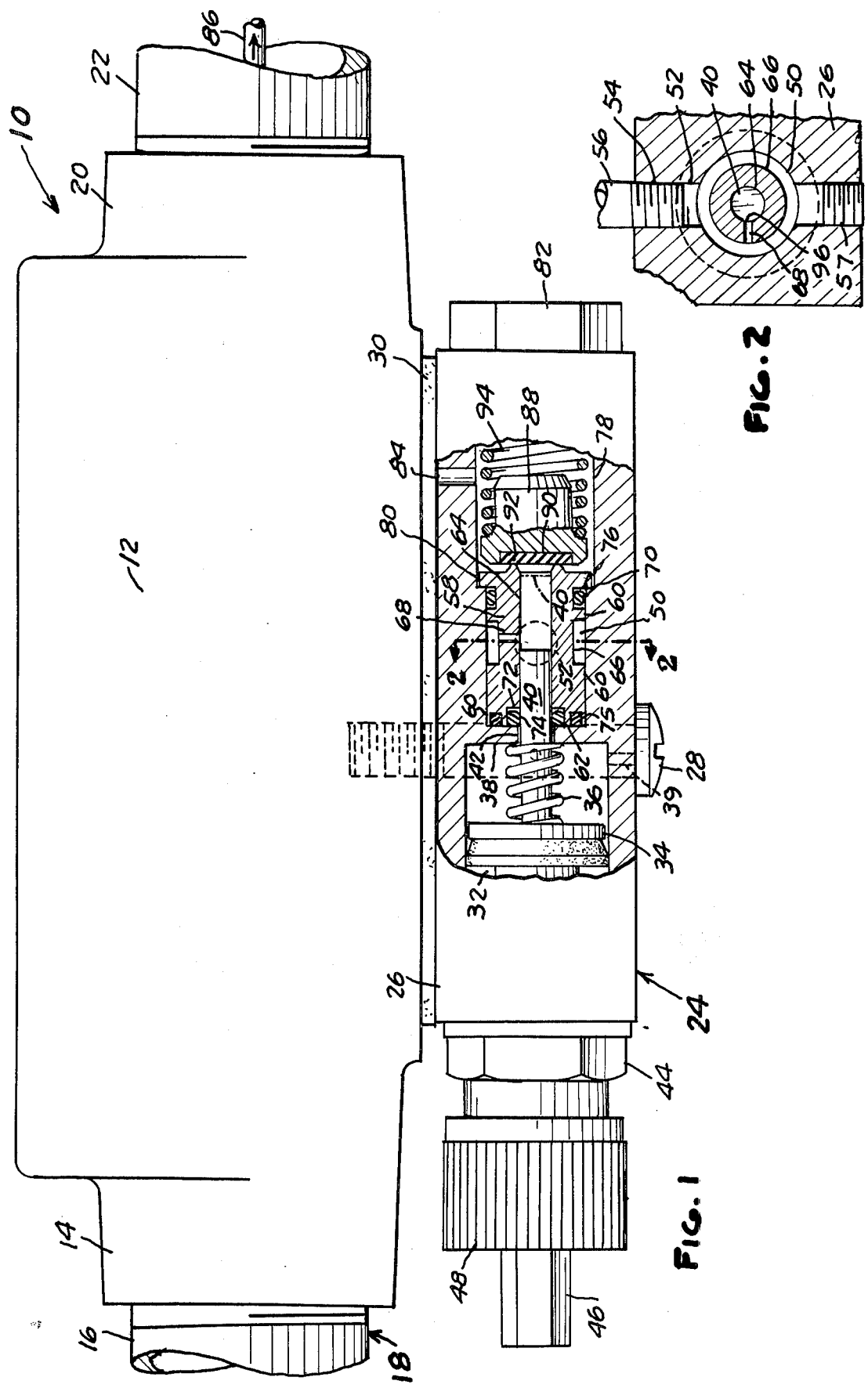
FIG. 1 is a generally top plan view of a lubricator embodying the present invention with portions broken away and shown in section to illustrate structural detail.
FIG. 2 is a sectional view on line 2—2 of FIG. 1.

Shown in the drawings is a lubricator 10 according to the present invention having a body 12 with an inlet 14 threaded for engagement with an upstream portion 16 of an air line 18 and having an outlet 20 threaded for engagement with a downstream portion 22 of the air line. A lubricant pump 24 having a body 26 is secured to body 12 by such means as bolting 28. A gasket 30 is interposed between pump body 26 and body 12.

Pump body 26 has a hollow interior portion forming a pneumatic cylinder 32 containing a piston 34 movable to the right as FIG. 1 is viewed by air under pressure in the cylinder and returnable to the left by a coil spring 36 compressed between piston 34 and an end wall 38 of the cylinder. Movement of piston 34 is facilitated by a vent 39 from the right hand end of cylinder 32 to the atmosphere. Piston 34 carries a piston rod 40 which extends through an opening 42 in end wall 38 and which forms a pump plunger. The end of cylinder 32 opposite from wall 38 is closed by a cap 44 and a piston rod extending axially oppositely from plunger 40 projects through cap 44 to an exterior location as at 46. By observing axial movements of rod 46 it can be determined whether pump 24 is functioning properly. Also, rod 46 can be manually depressed for operating the pump. A rotatable knob 48 on rod 46 has associated mechanism by which the at rest position of rod 46 and piston 34 can be axially adjusted for adjusting the stroke of plunger 40. Rod 46 and the stroke adjusting mechanism are conventional.

Lubricator body 12 contains a device (not shown) which senses variations in the condition of the air in air line 18 such as starting and stopping of air flow and in response to such variations introduces air under pressure into cylinder 32 for advancing piston 34 and plunger 40 from the solid line position to the dotted line position of FIG. 1 in its lubricant injection stroke and the relieves the air pressure in cylinder 32 to permit return of piston 34 and plunger 40 to the solid line position of FIG. 1 by spring 36 acting upon piston 34. An example of such a sensing device is disclosed in my U.S. Pat. No. 3,926,279.

Pump body 26 has a hollow interior portion forming a cylindrical chamber 50 which extends axially away from wall 38 in a direction opposite from cylinder 32. Extending radially from chamber 50 to the exterior of body 26 is a lubricant inlet 52 threaded at 54 for reception of a lubricant supply line 56, and a drain outlet 57 threaded for receiving a drain plug (not shown).

A spool-shaped insert 58 is disposed within chamber 50. The insert has outer cylindrical surface portions 60 which fit within the cylindrical wall of chamber 50 and an end 62 of the insert engages axially against wall 38 which forms an end wall of chamber 50. Insert 58 has a central axial opening 64 which forms the guideway for plunger 40. The exterior of the insert has an annular groove 66 and a radial port 68 extends between guideway 64 and groove 66. Groove 66 is axially aligned with inlet 52 when end 62 of the insert is engaged against wall 38. The exterior surface 60 of the insert has an annular recess axially displaced from groove 66 which contains an O-ring 70. Guideway 64 has a radial enlargement 72 adjacent one end which contains an O-ring 74 engaged against plunger 40 and end wall 38. End 62 of the insert has an annular recess which contains an O-ring 75 engaged against wall 38. During operation of pump 24, the lubricant delivery circuitry is isolated from other portions of pump body 26 by O-rings 70, 74 and 75.

For reasons set forth below, port 68 has a diameter which is small as compared to the diameter of guideway 64. Preferably, the diameter of port 68 is in the range of about ¼ to about ⅜ the diameter of the guideway.

Chamber 50 steps radially outwardly at a shoulder 76 and continues in a cylindrical portion 78 of enlarged diameter. Insert 58 has a flange 80 with a cylindrical exterior which fits within enlargement 78 and engages axially against shoulder 76. Chamber portion 78 is closed by a cap 82. A lubricant outlet 84 extends from chamber portion 78 to the exterior of valve body 26 for delivering lubricant to a tube 86 which extends through the interior of air line 18 to the equipment to be lubricated. A check valve 88 in chamber portion 78 has a seal 90 urged into engagement against a raised annular seat 92 on an end of insert 58 by a coil spring 94 compressed between the check valve and closure 82.

In use when lubricant is initially introduced into the pump through supply line 56, the air in opening 52 and the annular space formed by groove 66 must vent from the system in order for the pump to function properly. To promote such venting, opening 52 has a diameter of about 3/16 inch which is the smallest diameter through which air will vent satisfactorily through a tubular opening. The annular space formed by groove 66 and the wall of chamber 50 has a radial dimension adequate to enable the lubricant to flow into and fill the space. The annular space forms a circuit as distinguished from a tubular opening, such as opening 52, so that when lubricant fills the annular space any air therein is forced toward opening 52 and vents from the system. In a typical pump 24, the radial dimension of the annular space is about 0.120 inch. Any air trapped in guideway 64 is purged through the pump outlet by the pumping action of plunger 40 during subsequent use. For the reasons brought out below, any air trapped in port 68 is also purged by the pumping action of plunger 40.

Each time that a flow of air starts in air line 18, piston 34 and plunger 40 are moved to the right as FIG. 1 is viewed past port 68 toward check valve 88 to the dotted line position of FIG. 1. The plunger forces a measured quantity of lubricant past check valve 88 and through outlet 84 into delivery tube 86. Each time that the flow of air stops in air line 18, pressure is relieved in cylinder 32 and spring 36 returns plunger 40 to the left from the dotted line position to the solid line position of FIG. 1 wherein the end of plunger 40 has retracted to the left beyond port 68. Check valve 88 closes under the impetus of spring 94 after completion of the lubricant injection stroke of plunger 40.

During the injection stroke, check valve 88 and friction in the system resist the flow of lubricant under the impetus of plunger 40. This resistance creates pressure in the lubricant in that part of guideway 64 to the right of port 68. This pressure in turn tends to force lubricant in a retrograde direction past plunger 40 toward port 68. In pump 24, lubricant can escape retrograde past plunger 40 only at region 96 (FIG. 2) where port 68 interrupts the circumferential interengagement between plunger 40 and guideway 64. The arcuate extent of this interruption is very small, for example, 10° to 12°. Throughout the remaining arcuate extent of interengaged plunger 40 and guideway 64, retrograde escape of the lubricant is effectively prevented or reduced to insignificant proportions.

In a typical pump 24, plunger 40 has a diameter of ⅛ inch and port 68 has a diameter of 0.093 inch. In a typical conventional injection type lubricator, the plunger also has a diameter of ⅛ inch but the lubricant inlet to the plunger guideway must have a diameter of at least 3/16 inch to insure venting as discussed above. Therefore, the upstream end of the guideway opens into the inlet around the entire circumference of the plunger and retrograde escape of the lubricant during the injection stroke takes place around the entire circumference of the plunger.

In a conventional lubricator having a ⅛ inch diameter plunger, lubricant delivery in accurately measured quantities occurs down to about 0.040 inch penetration of the plunger into guideway 64. At 0.040 inch penetration, the lubricator delivers about 1/10 drop per injection stroke. The conventional lubricator will deliver smaller quantities of lubricant but upon less than about 0.040 inch penetration the delivery rate becomes erratic. In a lubricator according to the present invention having a ⅛ inch diameter plunger, delivery of lubricant in accurately measured quantities is obtained down to about 0.020 inch penetration of plunger 40 into guideway 64. At about 0.020 inch penetration, about 1/20 drop of lubricant is delivered in each injection stroke. Pump 24 will deliver lubricant in smaller quantities but upon less than 0.020 inch penetration into guideway 64 delivery rate becomes erratic.

In a typical pump 24 the clearance between plunger 40 and guideway 64 is about 0.0002 inch to 0.0004 inch. Because of this close fit and the small interruption of that fit by port 68, when plunger 40 is retracted by spring 36 it creates a vacuum in guideway 64 and when the end of the plunger clears port 68, lubricant is drawn into passageway 64 by the vacuum. Thus, unlike conventional injection lubricators which are gravity fed, lubricator 10 need not be mounted in any particular right side up or vertical orientation. Also, any air trapped in port 68 during initial filling of the system is drawn into guideway 64 when plunger 40 retracts and is subsequently purged from the system in the manner described above.

The use of insert 58 enables pump body 26 to be made of inexpensive materials such as a die casting or injection molded plastic thus eliminating the necessity for expensive machining of various parts of the body for the purpose of obtaining lubricant delivery accurately at predetermined rates. Only insert 58 and plunger 40 must be machined. A suitable material for these elements is brass which is easily machined and the surfaces which require machining, e.g., plunger 40 and guideway 64 are easily accessible. Thus, an assembly of an insert 58 and piston 34 together with plunger 40 is inexpensive, typically costing about $.16 to make.

The delivery rate of pump 24 can be adjusted within limits by turning knob 48 to adjust the depth to which plunger 40 will penetrate guideway 64 beyond port 68 in the injection stroke. A conventional lubricant pump can not be adjusted beyond the limits of the adjusting mechanism since the plunger guide is machined into the pump body. For example, a conventional lubricator having a ⅛ inch diameter plunger can deliver lubricant accurately at rates ranging from about 0.1 drop to about 1.0 drop per stroke.

Pump 24, however, is not so limited. By removing caps 44 and 82 from pump body 26, insert 58 and piston 34 together with plunger 40 can be removed from the pump body. A piston 34 and an insert 58 having a larger or smaller diameter plunger and guideway respectively can be selected and installed in pump body 26. When caps 44 and 82 are replaced on the body, the modification is complete. Thus, a single pump body 26 can be modified to deliver lubricant at rates ranging from about 1/40 drop per stroke to about 3 drops per stroke simply by selection of the appropriate plunger 40 and insert 58. It is contemplated that a set of three plungers and inserts will be required to facilitate modification of a pump 34 for delivering lubricant in this range of delivery rates. The plunger diameters would be respectively 1/16 inch, ⅛ inch and 3/16 inch, and passageways 64 would be dimensioned accordingly. The diameter of port 68 would be about 0.040 inch for the 1/16 inch plunger and about 0.093 for the other sizes of plungers.

I claim:

1. In a lubricator having a body with a lubricant inlet which opens into a guideway for a pump plunger reciprocable to force a predetermined quantity of lubricant intermittently through an outlet in said body, improved structure wherein, said body has an internal chamber, an insert in said chamber having an axial opening therethrough aligned with said plunger and forming said guideway, said insert having a port which extends from the exterior of said insert to said guideway and forms the downstream portion of said inlet, said port having a cross dimension which is small as compared to that of said guideway, said chamber having a substantially cylindrical wall, said insert having substantially cylindrical surface portions fitted within said wall, said inlet including an opening from said chamber to the exterior of said body, said insert having an external circumferential groove aligned with said body opening and forming a portion of said inlet, said port having an upstream end which opens into said groove, said insert having two external annular recesses spaced in axially opposite directions from said groove, and O-rings in said recesses at least one of which is engaged against said wall.

2. The structure defined in claim 1 wherein said cross dimension of said port is in the range of about $\frac{1}{4}$ to about $\frac{2}{3}$ that of said guideway.

3. The structure defined in claim 1 wherein said chamber has an apertured end wall through which said plunger passes, said insert having adjacent one end a radial enlargement of said guideway with an O-ring therein engaged against said plunger and said end wall.

4. The structure defined in claim 5 wherein said one end of said insert is axially recessed and forms a annular recess which contains the other of said O-rings, said other O-ring being engaged against said end wall.

5. The structure defined in claim 1 wherein said chamber has a continuation which contains a check valve, said insert having an end portion which forms a seat for said check valve in inactive condition of said plunger.

6. The structure defined in claim 5 wherein said cross dimension of said port is in the range of about $\frac{1}{4}$ to about $\frac{2}{3}$ that of said guideway, said body opening extending radially from said chamber to the exterior of said body, said chamber having an apertured end wall through which said plunger passes, said insert having adjacent one end a radial enlargement of said guideway with an O-ring therein engaged against said plunger and said end wall.

7. In a lubricator having a body with a lubricant inlet which opens into a guideway for a pump plunger reciprocable to force a predetermined quantity of lubricant intermittently through an outlet in said body, improved structure wherein, said body has an internal chamber defined in part by a circumscribing side wall having an aperture which forms a part of said inlet, an insert in said chamber having exterior peripheral surface portions fitted within said side wall, said insert having an axial opening therein aligned with said plunger and forming said guideway, said insert having an exterior peripheral groove forming a portion of said inlet, said insert having a port which extends between said groove and guideway to form the downstream portion of said inlet, said port having a cross dimension which is small as compared to that of said guideway, and seal means between the interior of said chamber and the exterior of said insert located in axially opposite directions from said groove.

8. The structure defined in claim 7 wherein said cross dimension of said port is in the range of about $\frac{1}{4}$ to about $\frac{2}{3}$ that of said guideway.

* * * * *